Dec. 11, 1934.  J. Q. A. HOLLOWAY  1,983,697
OPTICAL SOUND RECORDING AND REPRODUCING SYSTEM
Filed Aug. 8, 1931  4 Sheets-Sheet 1
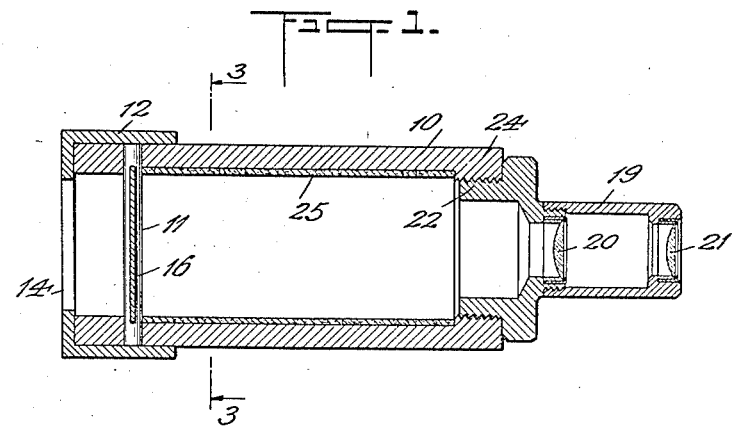
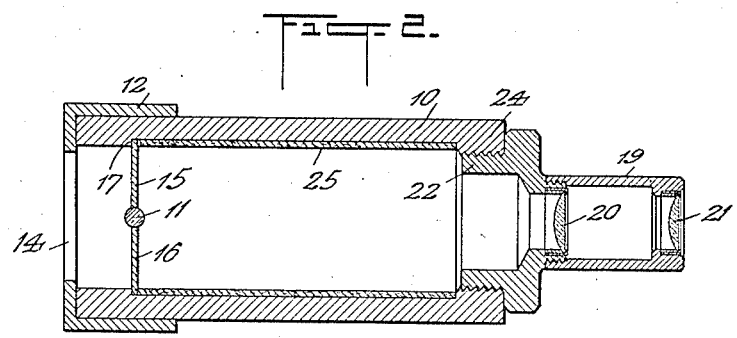
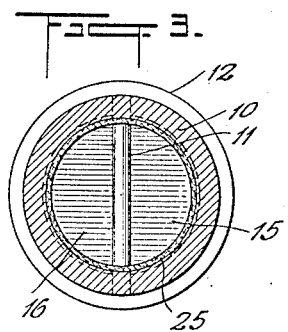
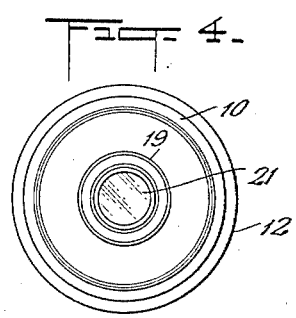
INVENTOR.
John Q. A. Holloway
BY Williams, Rich & Morse
ATTORNEYS.

Dec. 11, 1934.  J. Q. A. HOLLOWAY  1,983,697
OPTICAL SOUND RECORDING AND REPRODUCING SYSTEM
Filed Aug. 8, 1931  4 Sheets-Sheet 2
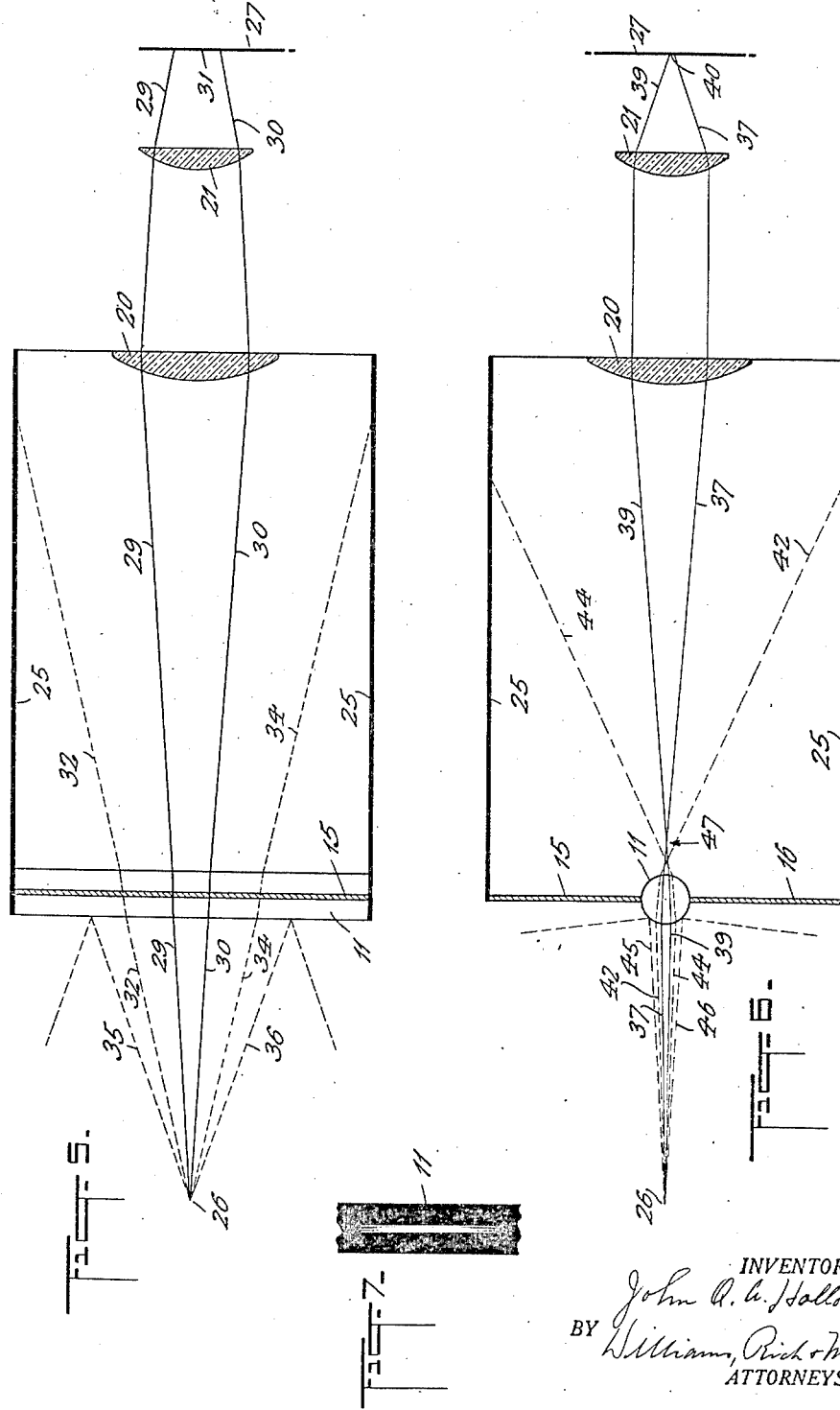
INVENTOR.
John Q. A. Holloway
BY Williams, Rich & Morse
ATTORNEYS.

Dec. 11, 1934.   J. Q. A. HOLLOWAY   1,983,697
OPTICAL SOUND RECORDING AND REPRODUCING SYSTEM
Filed Aug. 8, 1931   4 Sheets-Sheet 3
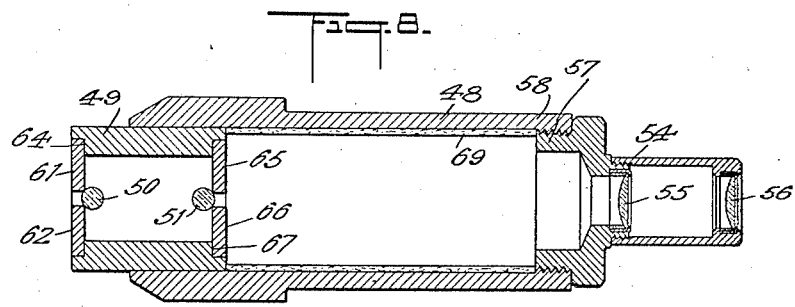
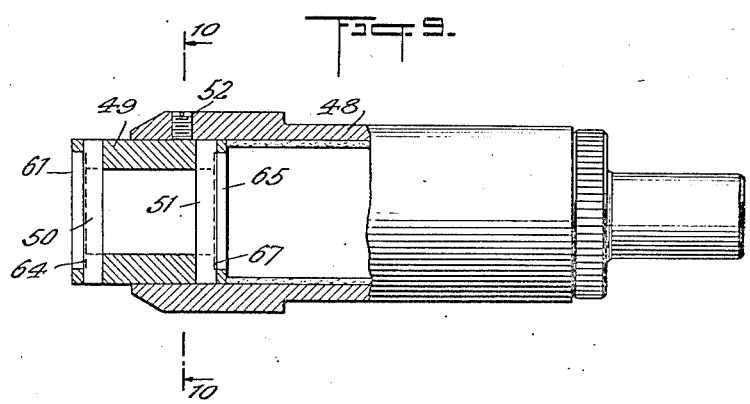
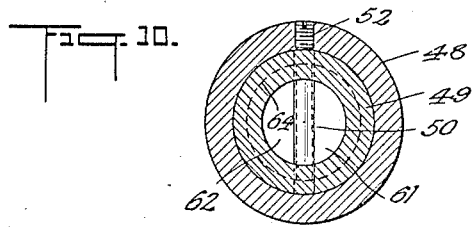
INVENTOR.
John Q. A. Holloway
BY Williams, Rich & Morse
ATTORNEYS.

Dec. 11, 1934.   J. Q. A. HOLLOWAY   1,983,697
OPTICAL SOUND RECORDING AND REPRODUCING SYSTEM
Filed Aug. 8, 1931   4 Sheets-Sheet 4
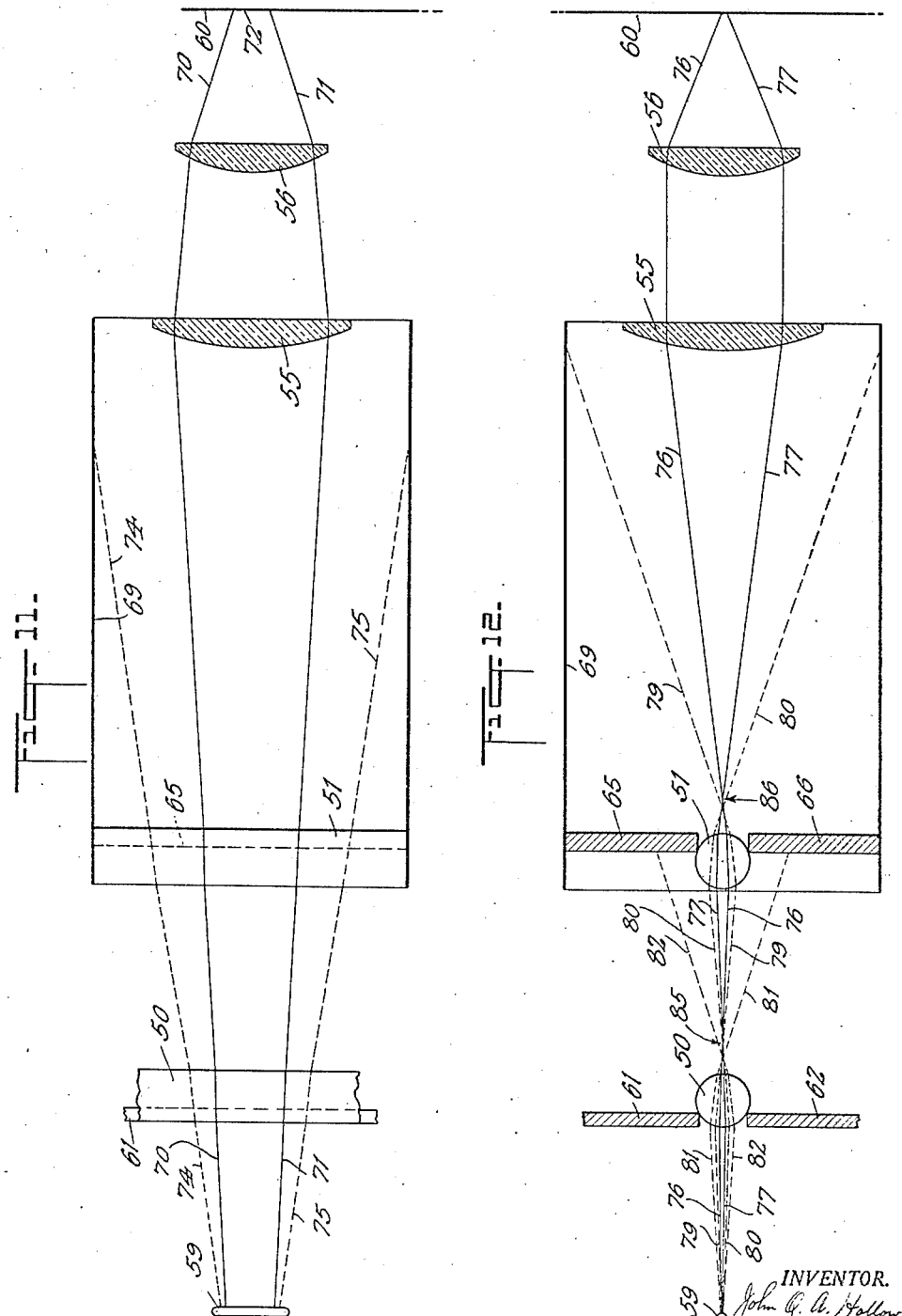

Patented Dec. 11, 1934

1,983,697

UNITED STATES PATENT OFFICE 1,983,697

OPTICAL SOUND RECORDING AND REPRODUCING SYSTEM

John Q. A. Holloway, New York, N. Y., assignor to National Sound System, Inc., Jersey City, N. J., a corporation of New Jersey Application August 8, 1931, Serial No. 555,923

10 Claims. (Cl. 88—24)

The invention set forth in this application, which is a continuation in part of my former application Serial No. 452,162, filed May 14, 1930, relates to optical devices, and more particularly to such devices employed in the recording of sound waves in air on a sensitized motion picture film and the subsequent reproduction of such sound from said recorded waves.

An essential requirement of optical devices of the character mentioned is that they form on the moving film a uniformly illuminated area of minute width. Such devices, however, have heretofore necessitated special constructions of the lamp filament used as the light source, precision in the adjustment of the source of illumination and the optical system with reference to their axes and to the path of travel of the film.

The primary object of the present invention is to provide an improved optical device by which fineness or definiteness of a small image and uniformity of its light intensity may be effected and by which the above mentioned difficulties of present devices may be eliminated.

Another object of the present invention is to provide an optical device which is of simple construction and may be manufactured at little cost.

In carrying out my invention I utilize a light ray gathering element of glass or other transparent light-refracting material associated with a light source, which functions by reason of its refraction characteristic to concentrate light rays issuing from said source into a narrow and elongated zone of intense illumination located close to the surface from which said rays are emitted. In combination therewith, I utilize a lens or system of lenses, designed to function so as to eliminate scattered light from the marginal portions of said zone and focus only those rays of light received from the center portion of the gathering element into a still further sharply defined area of intensification in a field through which the recording film travels.

In carrying out my invention I may use one or more glass rods or cylinders as the light gathering element and I preferably utilize a plurality of such cylinders disposed parallel to each other. Since with each cylinder a uniformly illuminated and sharply defined light image or zone is formed close to its rear surface, it is possible by using two of such cylinders to eliminate in the sound record most, if not all, of the scattered light rays and at the focus point obtain a very satisfactory image for recording purposes. An image of excellent character is formed on the moving film by the optical system comprising my invention, and I have discovered that its formation is largely independent of the construction or shape of the lamp filament or other light source and that there exists a substantially wide latitude in the positioning of the light source relatively to the rod or rods and away from the axis of the device. The fine image which I am able to obtain in the field traversed by the moving filament is thus made possible without requiring precise axial adjustment of the light source and optical system.

The invention will be understood with the aid of the following description taken in conjunction with the accompanying drawings in which Fig. 1 is a sectional view in elevation in the plane of the light gathering element or cylinder of the structure shown as one embodiment of my invention; Fig. 2 is a similar view thereof at right angles to the plane of Fig. 1; Fig. 3 is a cross-sectional view taken on the plane indicated by the line 3—3 of Fig. 1, looking in a direction from the right of Fig. 1; Fig. 4 is an end view, also looking in a direction from the right of Fig. 1; Fig. 5 is an enlarged schematic view illustrating the device shown in Figs. 1 to 4 inclusive, in association with a light source and a moving film, to show particularly the disposition of light rays transmitted in the axial plane in which the cylindrical gathering element is disposed; Fig. 6 is a similar view illustrating the disposition of light rays transmitted in the axial plane at right angles to said element; Fig. 7 is a fragmental view of the light gathering element, looking from the right of Figs. 5 and 6, and illustrates the elongated illuminated area formed on its rear surface; Figs. 8 and 9 illustrate another form of the invention, in which two light ray gathering elements or cylinders are utilized, and are sectional views of such device similar to Fig. 2 and Fig. 1, respectively; Fig. 10 is a cross-sectional view corresponding to Fig. 3 taken on the plane indicated by the line 10—10 of Fig. 9; Figs. 11 and 12 are enlarged schematic views of the form of the device shown in Figs. 8 to 10 inclusive, and correspond to Figs. 5 and 6.

For the purpose of illustrating the invention, I have shown in Figs. 1 to 4 inclusive, one form of the device which I have found in practice gives satisfactory results, although it is understood that the invention is not limited to the specific arrangement of its parts. In Figs. 8 and 9 I have shown a slightly different arrangement which I shall designate as a preferred structure as it possesses certain advantages which will be set forth fully hereinafter. The form of the device illustrated in Figs. 1 and 2 comprises a tubular mounting piece 10 having interiorly fitted thereto near one of its ends a light gathering element in the form of a cylindrical glass rod 11 of small diameter or curvature. The rod 11 extends across the rear end of the mounting at right angles to its axis and may be conveniently fixed in position by supporting its ends in alined openings formed through the wall of the tube. A cap piece having an aperture 14 of suitable diameter and a surrounding flange 12 may be fitted on the tube 10 to cover the exposed ends of the rod 11.

On the inner end of the tube 10 is fastened a lens mount 19 containing a pair of plano-convex lenses 20 and 21, disposed on the axis of the tubular mounting piece 10. The structure 19 may be removably secured by screwing its threaded end 22 into the interiorly threaded end 24 of the tubular piece 10, and need not be described in detail as its design may be that of a standard optical fitting.

Inasmuch as a device embodying my invention may be used either for recording or reproducing sound waves, the term "film" will be used generally to designate the focal point, or plane, of the light rays emerging from the optical system. When sound waves are being recorded the variations in light intensity are received on the photographically sensitized surface of a strip of negative motion picture film stock which it will be understood travels at a uniform speed. The film thus exposed is subsequently developed and the "sound track" appearing thereon may be of the variable density type or of the variable area type according to whether or not an oscillograph is employed for recording in conjunction with the optical system. In order to reproduce the sound from the film record it is understood that the developed film is passed in front of a beam of light and between the latter and a light sensitive cell such as a photo-electric tube which latter is connected in circuit with an amplifier and a loud speaker. In this instance the source of light furnished by my optical system is constant and the variations in the sound track on the developed film cause corresponding variations in the light transmitted to the light sensitive device.

In using my optical system, I position it relatively to a light source 26 and a moving film 27 (see Figs. 5 and 6) on or from which the sound vibrations are to be recorded or reproduced, so that light rays from the source passing through the device are caused to be focussed by the optical system on the moving film 27 to produce the required image thereon. Transmittal of light rays through the device which do not impinge on the rod 11, is prevented by means of two opaque segments 15 and 16, disposed interiorly of the tube 10 in the plane of said rod, the linear edges of said screen parts abutting opposite longitudinal portions of the rod. These screen parts 15 and 16 may be conveniently held in place by affixing their arcuate edges to a circular shoulder or seating ledge 17 formed in the bore of the tube. To check the advance of light rays, which traverse the rod 11, but do not impinge directly on the inner lens 20, the inner cylindrical area of the tube 10 intermediate the plane of the rod 11 and the inner end of the structure 19 is lined with a dark non-reflecting material 25, such as black velvet.

The operation of my optical system as a sound recording device will be readily understood by referring to Figs. 5 and 6, in which a light source is schematically illustrated as a point source 26 located substantially on the axis of the device at a suitable distance from the light ray gathering element 11. In these figures the moving film 27 is shown located transversely to the axis of the device at a suitable distance from the rear lens 21 and in the field in which the focal point of said lens lies.

The formation of the required image on the moving film 27 will be readily understood by a study of the light rays with relation to their effect by grouping them in planes parallel to the axis of the cylindrical element 11 and to their effect by grouping them in planes transverse to said axis.

All of the light rays from the source 26 traversing the element 11, in planes parallel to its axis, produce, when emerging therefrom at a focal point close to its surface, an illumination of appreciable length and narrow cross section. The rays from this area of illumination are subsequently focussed on the moving film 27, as an image of the desired length and width. This may be understood by an observance of the light rays in the axial plane of the element 11, as illustrated in Fig. 5. The beam of light from the source 26 intermediate the rays indicated by the lines 29 and 30 is refracted when traveling successively through the element 11 and the inner and outer lenses 20 and 21, and is finally focussed on the film 27, on which there is produced an image of a length indicated by 31 suitable for the recording or reproduction of sound waves. Other light rays in the plane of the element 11 impinging on the latter at an angle of incidence greater than the rays 29 and 30, such as the rays illustrated by the lines 32 and 34, are transmitted therethrough, but are checked in their travel by the nonreflecting material 25 and therefore fail to reach the inner lens 20; rays of still greater incidence, such as the rays indicated by the lines 35 and 36, are not transmitted through the rod 11, but are reflected therefrom.

All of the light rays in the glass transverse to the element 11 are caused by reason of refraction to emerge from said rod through a comparatively small portion of its periphery, and to produce near its rear surface a narrow zone of intensified illumination. The light rays from the marginal portions of said zone are not transmitted to the lenses 20 and 21, but the rays from a central portion of said zone are focussed by the lenses 20 and 21 on the field occupied by the film 27 whereby the proper minuteness of the focussed image is obtained. This will be further understood by an observance of the rays in the plane at right angles to the axis of the rod as illustrated in Fig. 6. Light rays from the source 26, such as those illustrated by the lines 37 and 39, are deflected when traversing the element 11 on a small portion of its surface, are again deflected when leaving the latter, and intersect at a point near the surface of said element. From this point the useful light rays are received and projected and focussed by the lenses 20 and 21 on the moving film 27. Thus the rays traversing the light gathering element and the system of lenses are spaced a minute distance apart at the film, there being produced on the latter an image of a width represented by 40 suitable for the desired recording of sound in accordance with the degree of intensity of the light source 26 which it is understood varies in accordance with the variations of the sound wave in the air as they affect a microphone or other recording instrument in circuit with said light source. Light rays of still greater incidence, such as the rays 42 and 44, are also deflected when traversing the element 11 on a small portion of its surface, but are deflected when leaving the rod at such an angle that they are checked in their travel by the non-reflecting material 25 and consequently do not reach the inner lens 20. Rays of still greater incidence, such as the rays 45 and 46, are not transmitted but are totally reflected.

From the foregoing it becomes apparent that there is produced on the element 11 an elongated illuminated area such as represented in Fig. 7, and that there is also produced near the rear surface of the rod where the rays converge or intersect a narrow and elongated light zone (as shown in Fig. 6 at the point indicated by the arrow 47) of intense illumination. It is observed that this light zone is located substantially in the plane of the more distant focal point of the optical device comprising the pair of lenses 20 and 21 and that the surface of the film 27 is located substantially in the plane of the nearer conjugate focal point of said optical device whereby a sharply defined beam of light of minute width is projected on the film. The light zone at point 47, although intense, lacks sharpness of definition because of scattered light rays (such as the rays 42 and 44) proceeding from the longitudinal marginal portions of the rod and produced by cylindrical aberration, so that the light rays at this point could not be satisfactorily applied directly to the film. However, extraordinary results are achieved by the further inclusion in the optical system of a pair of lenses 20 and 21, which act to not only concentrate or attenuate but unify or harmonize the central and most intense part of the light zone on the film. Halation, or scattered light rays proceeding from the light zone and some of which travel through the pair of lenses 20 and 21, appear to be substantially eliminated, and a very narrow, sharply defined image of great brilliancy is produced at the surface where the rays impinge on the film. It is also noted that the rays from outer end portions of the light zone do not proceed through the lenses 20 and 21, and that only the rays from a central longitudinal portion of the zone are focussed on the moving film 27. There is thus produced on the latter a sharp image of the required length and width preserving uniform illumination. The thinness, sharp definition, brilliancy and uniformity of illumination of the image made possible by the coordinated use of a rod of transparent light-refracting material and of a further focusing means are indeed remarkable, and tests have shown that the excellent character of this image surpasses, so far as I am at present informed, anything which has hitherto been achieved in this art.

The production of the image is independent of the construction or shape of the light source or lamp filament used as the light source, and by reason of refraction or concentration of a large number of the rays entering the element 11 in planes transverse to its axis, an increased illumination of the image is obtained for a given candle power or a much reduced voltage on a lamp filament may be utilized to produce the same degree of illumination as used in optical systems heretofore employed. There is also obtained a considerable latitude in the positioning of the light source with reference to the axis of the device, and its positioning away from said axis may also vary to an appreciable extent without impairing the quality of the image produced on the moving film.

In Figs. 8 to 10 inclusive, I have shown a device which has proved to be extremely satisfactory in practice. This device comprises a tubular piece 48 into one end of which is slidingly and removably fitted a tubular extension 49. Two glass rods 50 and 51 of small diameter or curvature are interiorly fitted to the tubular piece 49 near its opposite ends. These rods are disposed parallel to each other and diametrically at right angles to the axis of the device, and may be conveniently fixed to the tubular piece 49 by inserting their ends, respectively, into a pair of alined openings formed through the wall of said tubular holder 49. A set screw 52 extending through the mounting 48 serves to fix the position of the holder on the mounting.

To the other end of the mounting 48, in axial alinement therewith, is fastened an outwardly extending optical structure 54 comprising a pair of lenses 55 and 56.

In using this form of my device, it is so positioned relatively to the light source 59 and a moving film 60 (see Figs. 11 and 12), that light rays from the source travel successively through the outer rod 50, the inner rod 51, the inner lens 55 and the outer lens 56 and are caused to be focussed by the latter on the moving film 60 to produce the required image. A screen for preventing the transmittal of light rays through the device, which do not impinge directly on the outer rod 50, is formed by a pair of opaque segments 61 and 62, the proximate edges of which abut longitudinal portions of said rod 50. These segments may be conveniently held in place by glueing or otherwise affixing their arcuate edges to a circular recess or seating ledge 64 formed at the outer end of the tubular holder 49, and, as best shown in Fig. 8, they preferably provide an outer slot adjacent and in front of the rod 50, so that only a comparatively narrow or useful beam of light is allowed to pass through the rod 50. Another pair of opaque segmental parts 65 and 66 secured in an annular seat 67 and having their linear edges abutting opposite portions of the inner rod 51 form a second or inner slot which prevents transmittal of light rays through the device, which do not impinge directly on the inner rod 51. It should be observed that the slits formed by the pairs of screen parts 61, 62 and 65, 66 have a considerable area and need not be of the extreme thinness of the slits in the diaphragms employed in optical devices of this character. To guard against the advance of scattered light rays, or rays traveling through the rods 50 and 51 but not impinging directly on the inner lens 55, the inner cylindrical surface of the mounting 48 is lined with a dark non-reflecting material 69, such as black velvet.

Referring to Figs. 11 and 12, the light source 59 preferably consists of a lamp filament of suitable length, located substantially in the axial plane of the rods 50 and 51 and at a suitable distance from the outer rod 50. The moving film 60 is located transversely to the axis of the device at a suitable distance from the outer lens 56.

In Fig. 11, the beam of light from the filament 59 intermediate the rays indicated by the lines 70 and 71 is deflected when traveling successively through the outer rod 50, the inner rod 51, the inner lens 55 and the outer lens 56, and is finally focussed on the moving film 60, whereby there is produced on the latter an image of a length 72 suitable for the recording or reproduction of sound waves. Light rays, such as illustrated by the lines 74 and 75, are transmitted through the rods 50 and 51, but are checked in their travel by the non-reflecting material 69 and therefore do not reach the inner lens 55.

Referring to Fig. 12, light rays from the filament 59, such as illustrated by the lines 76 and 77, are deflected when traversing the outer rod 50 on a small portion of the latter's surface, are again deflected when leaving the rod 50, intersect at a point near the surface of the rod 50, are deflected when traversing the inner rod 51 on a small portion of the latter's surface, intersect at a point near the surface of the rod 51 and are finally focussed by the lenses 55 and 56. Light rays of greater incidence, such as the rays 79 and 80, travel through both rods 50 and 51, but are deflected when leaving the inner rod 51 at such an angle that they are checked in their travel by the non-reflecting material 69.

Here it should be observed that the rays 79 and 80, having a comparatively large angle of divergence upon leaving the light zone formed near the surface of the inner rod 51, are shown only for a better understanding of the modus operandi of the device, but that elimination of such rays may be effected by the construction of a device as shown utilizing two or more rods disposed parallel to one another, due to the fact that such rods act to successively decrease the angle of spread of the beams of light where they proceed from the respective light zones. Moreover, by utilizing slotted diaphragms, i. e. by properly spacing the segments of either or both of the pairs of screen parts 61, 62 and 65, 66, all of the light rays proceeding from the inner rod may be caused to impinge directly on the inner lens 55.

Light rays impinging on the outer rod 50 at an angle of incidence greater than the rays 79 and 80, such as the rays 81 and 82, may be transmitted through said rod 50, but are deflected when leaving the latter at such an angle that they are checked in their travel by the screen parts 65 and 66.

From the above description it becomes apparent that there is produced on each of the rods 50 and 51 an elongated illuminated area, similar in character to that described as being formed on the rod 11 and shown in Fig. 7, and that there is produced near each of said areas where the rays converge or intersect a narrow and elongated light zone of intense illumination. (In Fig. 12, the light zone formed near the rod 50 is indicated by the arrow 85 and the one formed near the rod 51 lies at the point indicated by the arrow 86). It is observed that scattered light rays proceeding from the longitudinal marginal portions of the light zone formed by the outer rod 50 are not transmitted through the inner rod 51, but only a comparatively narrow beam of rays located close to the axial plane of the rods 50 and 51 is permitted to travel through said rods 50 and 51, so that the inner rod 51 acts to further attenuate or concentrate the central and most useful and most intense part of the light proceeding from the zone produced by the outer rod 50. The light zone produced by the inner rod 51 is not only narrower than that produced by the outer rod 50, but is more brilliant, more uniform in its luminosity and more sharply defined, and less scattered light proceeds from its longitudinal marginal portions. By using the lens system which has the light zone produced by the inner rod 51 at its more distant focal point and the moving film at its nearer conjugate focal point, the actinic rays impinging on said film are caused to be more closely brought together, so that scattered light at the film is practically eliminated. There is thus produced on the surface of the film an extremely narrow image of extremely sharp definition.

It is also to be particularly noted that a device utilizing a plurality of light collectors or rods of transparent light refracting material disposed in parallel relation, permits an even greater latitude in the positioning of the light source relatively to the axis of the device than one utilizing only one of such rods. Further, by the use of a plurality of such rods, the production of the image is still more independent of the construction of the light source, and a still greater illumination of the image per unit of candle power at the source is obtained.

The importance of a device utilizing a plurality of rods may be appreciated when it is considered that the effect of halation increases with diminution of the image and therefore becomes particularly objectionable in the recording of the reproduction of sound because of the desirable thinness of the image to be formed on the moving film. A device utilizing a plurality of rods produces an image much finer than has hitherto been produced or obtainable, with substantially no halation whatever.

It will be understood that the invention is not limited to the particular embodiments shown and described, and that while these embodiments may be utilized in the recording or reproduction of sound in connection with a sound track of the variable density type and in the reproduction of sound in connection with a sound track of the variable width type, additional parts may be incorporated with the devices shown or other apparatus, such as an oscillograph, may be used to adapt the invention for use in the recording of sound vibrations to produce the variable width of sound track record.

What is claimed is:

1. An optical device for the reproduction of sound waves on or from a moving film, the combination with a light source, of a transparent light-refracting cylinder of circular cross-section disposed to receive rays of light emitted from said source and focus them in a narrow elongated zone of illumination close to the cylinder, and optical lens means for uniformly distributing such rays of said zone as proceed from its central portion to the exclusion of such rays as proceed from its longitudinal marginal portions to produce at a distant focal point a sharply defined image on the film.

2. An optical device for the reproduction of sound waves on or from a moving film, the combination with a light source, of a transparent light-refracting cylinder of circular cross-section disposed transversely to rays of light emitted from said source whereby rays traveling through and emerging from said cylinder form a narrow and elongated zone of intense illumination, opaque means for intercepting light rays proceeding from marginal portions of said light zone, and optical lens means for directing on the moving film light rays proceeding from the central portion of said zone to the exclusion of light rays proceeding from marginal portions of said zone.

3. An optical device for the reproduction of sound on or from a moving film, the combination with a light source, of a transparent light-refracting cylinder of circular cross-section disposed transversely to rays of light emitted from said source whereby rays traveling through and emerging from said cylinder form a narrow elongated zone of intense illumination close to said cylinder, means for eliminating light rays proceeding from marginal and end portions of said light zone, and a pair of lenses for directing and further attenuating on the moving film the beam of light rays proceeding from the center portion of said zone to the exclusion of light rays proceeding from marginal and end portions of said zone.

4. In an optical device for the recording or reproduction of sound on or from a moving film, a tubular mounting adapted to be placed in axial alinement with a light source, a cylinder of transparent light-refracting material of circular cross-section disposed within the mounting transversely to its axis for directing rays from said source into a narrow elongated zone of light, an optical system also disposed within the structure for directing on the moving film such light rays traversing the cylinder as proceed from the central portion of said zone to the exclusion of such rays traversing the cylinder as proceed from marginal portions of said zone, and opaque means for preventing transmittal of light through the spaces intermediate the rod and the mounting.

5. In an optical device for the recording or reproduction of sound on or from a moving film, a tubular mounting adapted to be placed in axial alinement with a light source, a cylinder of transparent light-refracting material of circular cross-section transversely disposed at one end of the mounting for directing rays from said source into a narrow elongated zone of light, a lens system in said mounting disposed to focus on the moving film such light rays traversing the cylinder as proceed from the central portion of said zone, opaque screens for preventing transmittal of light through the spaces intermediate the rod and the mounting, and non-reflecting means at the inner surface of said structure for checking advance of scattered rays proceeding from the marginal portions of said zone.

6. In an optical device for the recording or reproduction of sound on and from a moving film, the combination with a light source, of a plurality of transparent light-refracting cylinders of circular cross-section parallelly disposed in substantially a common plane with said light source and spaced a substantial distance apart whereby a narrow and elongated zone of intense illumination is formed where the rays converge from said cylinders, and a lens system for projecting on the film such rays as proceed from the central uniformly illuminated portion of said zone.

7. In an optical device for the recording or reproduction of sound waves on or from a moving film, the combination with a light source, of a plurality of transparent light-refracting cylinders of circular cross-section parallelly disposed substantially in a common plane with the light source and spaced a substantial distance apart whereby a narrow and elongated zone of intense illumination is formed where the rays converge from said cylinders, a lens system for projecting and further attenuating on the moving film such rays as proceed from the central uniformly illuminated portion of said zone, and shielding means checking the travel of light rays to said lens system with the exception of such rays as travel successively through said cylinders and from said central useful portion of said zone.

8. In an optical device for the recording or reproducing of sound on or from a moving film, a source of light, a tubular mounting in axial alinement therewith, a plurality of parallel transparent light-refracting cylinders of circular cross-section disposed in the mounting transversely to its axis and spaced a comparatively large distance apart relatively to their diameters whereby a narrow elongated zone of intense illumination is formed where rays from said source converge from said cylinders, a lens system also carried by the mounting for projecting on the moving film such light rays traversing the rods as proceed from the central uniformly illuminated portion of said zone, and shielding means for preventing transmittal of light with the exception of such light rays as travel successively through said cylinders and from said central portion of said zone.

9. In an optical device for the recording or reproducing of sound on or from a moving film, a tube adapted to be placed in axial alinement with a light source, a plurality of parallel transparent light-refracting cylinders of circular cross-section disposed in the mounting transversely to its axis and spaced a comparatively large distance apart relatively to their diameters whereby a narrow elongated zone of intense illumination is formed where rays from said source converge from said cylinders, a lens system also disposed within the mounting for projecting on the moving film such light rays traversing the rods as proceed from the central uniformly illuminated portion of said zone, and opaque means for preventing transmittal of light with the exception of such light rays as travel successively through all of said cylinders, and non-reflecting means at the inner surface of said mounting for checking the advance of rays to said lens system other than said rays proceeding from said central portion of said zone.

10. An optical device for the reproduction of sound waves on or from a moving film, the combination with a light source, of a transparent light-refracting cylinder of circular cross-section disposed to receive rays of light emitted from said source and focus them into a narrow elongated zone of illumination close to the cylinder, and optical lens means for uniformly distributing and further attenuating the beam of such rays of said zone as proceed from its central portion to the exclusion of scattered rays as proceed from its longitudinal marginal portions to produce at a distant focal point a sharply defined image of minute width on the film.

JOHN Q. A. HOLLOWAY.